(12) United States Patent
Jensen

(10) Patent No.: US 10,407,887 B2
(45) Date of Patent: Sep. 10, 2019

(54) SYSTEMS AND METHODS FOR AUTOMATICALLY CLEANING A LAVATORY FLOOR

(71) Applicant: THE BOEING COMPANY, Chicago, IL (US)

(72) Inventor: Charles C. Jensen, Marysville, WA (US)

(73) Assignee: The Boeing Company, Chicago, IL (US)

( * ) Notice: Subject to any disclaimer, the term of this patent is extended or adjusted under 35 U.S.C. 154(b) by 199 days.

(21) Appl. No.: 15/176,323

(22) Filed: Jun. 8, 2016

(65) Prior Publication Data

US 2017/0284076 A1   Oct. 5, 2017

Related U.S. Application Data

(60) Provisional application No. 62/316,012, filed on Mar. 31, 2016.

(51) Int. Cl.
| | |
|---|---|
| *E03D 9/00* | (2006.01) |
| *B64D 11/02* | (2006.01) |
| *B64F 5/30* | (2017.01) |
| *B64C 1/18* | (2006.01) |

(52) U.S. Cl.
CPC .............. *E03D 9/002* (2013.01); *B64C 1/18* (2013.01); *B64D 11/02* (2013.01); *B64F 5/30* (2017.01)

(58) Field of Classification Search
None
See application file for complete search history.

(56) References Cited

U.S. PATENT DOCUMENTS

| | | | | |
|---|---|---|---|---|
| 1,758,498 | A | * | 5/1930 | Burnelli ................. B64C 39/00 244/36 |
| 3,995,328 | A | | 12/1976 | Carolan |
| 4,063,315 | A | | 12/1977 | Carolan |
| 4,819,276 | A | | 4/1989 | Stevens |
| 5,233,723 | A | * | 8/1993 | Hung ....................... A47L 9/02 15/339 |

(Continued)

FOREIGN PATENT DOCUMENTS

| | | |
|---|---|---|
| CN | 101676500 | 3/2010 |
| DE | 4221508 | 1/1994 |

(Continued)

OTHER PUBLICATIONS

KR-100729343-B1 Translation (Year: 2007).*

(Continued)

*Primary Examiner* — Rita P Adhlakha
(74) *Attorney, Agent, or Firm* — Joseph M. Butscher; The Small Patent Law Group, LLC

(57) ABSTRACT

A self-cleaning floor assembly is configured to form or be positioned on a floor of an enclosed space. The self-cleaning floor assembly includes a moveable floor including a moveable floor panel, an actuation system that is operatively coupled to the floor panel, and a cleaning system proximate to at least a portion of the moveable floor. The actuation system is configured to move at least a portion of the floor panel into and through the cleaning system during a cleaning cycle. The cleaning system is configured to clean the portion(s) of the floor panel during the cleaning cycle.

20 Claims, 8 Drawing Sheets

(56) References Cited

U.S. PATENT DOCUMENTS

2003/0177572 A1    9/2003   Guerin
2014/0115764 A1    5/2014   Cheng

FOREIGN PATENT DOCUMENTS

| DE | 69816591 | 9/1998 |
| DE | 9816591 | 6/2004 |
| DE | 102008034072 | 2/2010 |
| JP | H01250538 | 10/1989 |
| KR | 100729343 | 6/2007 |
| WO | WO 2013053712 | 4/2013 |
| WO | WO 2014036217 | 3/2014 |

OTHER PUBLICATIONS

Combined Search and Examination Report for GB1703788.8 dated Aug. 8, 2017.
Examination Report for GB1703788.8, dated Apr. 2, 2019.

* cited by examiner

SYSTEMS AND METHODS FOR AUTOMATICALLY CLEANING A LAVATORY FLOOR

RELATED APPLICATIONS

This application relates to and claims priority benefits from U.S. Provisional Patent Application No. 62/316,012, entitled "Systems and Methods for Automatically Cleaning a Lavatory Floor," filed Mar. 31, 2016, which is hereby incorporated by reference in its entirety.

FIELD OF THE DISCLOSURE

Embodiments of the present disclosure generally relate to systems and methods for automatically cleaning a floor, such as a lavatory floor within a commercial aircraft.

BACKGROUND OF THE DISCLOSURE

Commercial aircraft are used to transport passengers between various locations. During a flight—particularly a trans-oceanic or other long haul flight—passengers are typically confined within certain areas (for example, cabins) of an aircraft. Various individuals (such as passengers, pilots, flight attendants, and the like) use certain internal portions of an aircraft during a flight. For example, numerous individuals may use a lavatory within an internal cabin during a flight.

As can be appreciated, with each use, the cleanliness of a lavatory onboard an aircraft may be compromised. Individuals onboard may be sensitive to health risks presented by a frequently-used lavatory onboard an aircraft. Indeed, as each individual uses a lavatory onboard an aircraft, the likelihood of germs and bacteria therein increases.

An aircraft lavatory is generally cleaned between flights. For example, maintenance or cleaning personnel board the aircraft on the ground before and/or after a flight to clean the lavatory. However, during a flight, the lavatory is typically not cleaned, despite the fact that numerous individuals may use the lavatory during the flight. While flight attendants may be able to clean the lavatory, they are usually preoccupied with other duties during the flight. As such, cleaning the lavatory may not be a top priority for flight attendants during a flight or even between flights.

Consequently, the cleanliness of lavatories onboard an aircraft may be compromised, particularly during flights. In general, during a flight, a lavatory onboard an aircraft may become dirty, wet, smelly, and the like due to use by individuals onboard the aircraft during the flight. As such, a flight experience for individuals onboard the aircraft may be negatively impacted.

Moreover, with repeated use, portions of the floor of the lavatory may be covered with liquids. Even after being cleaned, the floor of the lavatory may be wet from cleaning fluids. A wet lavatory floor may be unsettling to individuals, even if they know the floor is clean. That is, a wet floor may give the impression of unsanitary conditions. Further, a wet floor may pose a safety hazard in that an individual may slip and fall on the wet floor.

SUMMARY OF THE DISCLOSURE

A need exists for a system and a method for cleaning a floor. A need exists for a system and method for automatically cleaning a floor of a lavatory after use. A need exists for a system and a method for effectively and efficiently cleaning a lavatory floor onboard an aircraft, particularly during a flight.

With those needs in mind, certain embodiments of the present disclosure provide a self-cleaning floor assembly that is configured to form or be positioned on a floor of an enclosed space. The self-cleaning floor assembly includes a moveable floor including a moveable floor panel, an actuation system that is operatively coupled to the floor panel, and a cleaning system proximate to at least a portion of the moveable floor. The actuation system is configured to move at least a portion of the floor panel into and through the cleaning system during a cleaning cycle. The cleaning system is configured to clean the portion(s) of the floor panel during the cleaning cycle.

The moveable floor may also include at least one conveyor moveably coupled to the floor panel, and a support that is configured to support the floor panel. A width of the floor panel may be the same as the width of a threshold of the enclosed space.

The actuation system may include an actuator. At least one link may operatively couple the actuator to the moveable floor.

The cleaning system may include a vacuum that is configured to remove debris from the portion(s) of the floor panel. The cleaning system may include a cleaner that is configured to clean the portion(s) of the floor panel during the cleaning cycle. The cleaning system may include a dryer that is configured to dry the portion(s) of the floor panel during the cleaning cycle The cleaner may include at least one nozzle in fluid communication with a storage tank that contains cleaning fluid. The cleaning fluid is deposited onto the portion(s) of the floor panel through the nozzle(s) during the cleaning cycle. The cleaner may include at least one ultraviolet (UV) light that is configured to irradiate the portion(s) of the floor panel during the cleaning cycle.

In at least one embodiment, the actuation system and the cleaning system are deactivated when the enclosed space is occupied by an individual. In at least one embodiment, the self-cleaning floor assembly includes a control unit that is in communication with the actuation system and the cleaning system. The control unit is configured to operate the actuation system and the cleaning system during the cleaning cycle. The control unit may be configured to deactivate the actuation system and the cleaning system when the enclosed space is occupied by an individual.

Certain embodiments of the present disclosure provide a method of automatically cleaning a floor within an enclosed space. The method includes operatively coupling an actuation system to a floor panel of a moveable floor, moving (by the actuation system) at least a portion of the floor panel into and through a cleaning system during a cleaning cycle, and cleaning (by the cleaning system) the portion(s) of the floor panel during the cleaning cycle.

Certain embodiments of the present disclosure provide an aircraft that includes a fuselage having an internal cabin. A lavatory is located within the internal cabin. Wings outwardly extend from the fuselage. An empennage outwardly extends from the fuselage. One or more engines are carried by one or more of the wings and the empennage. A self-cleaning floor assembly forms or is positioned on a floor of the lavatory. The self-cleaning floor assembly includes a moveable floor including a moveable floor panel, an actuation system that is operatively coupled to the floor panel, and a cleaning system proximate to at least a portion of the moveable floor. The actuation system is configured to move at least a portion of the floor panel into and through the cleaning system during a cleaning cycle. The cleaning system is configured to clean the portion(s) of the floor panel during the cleaning cycle.

DETAILED DESCRIPTION OF THE DISCLOSURE

Figure 1:
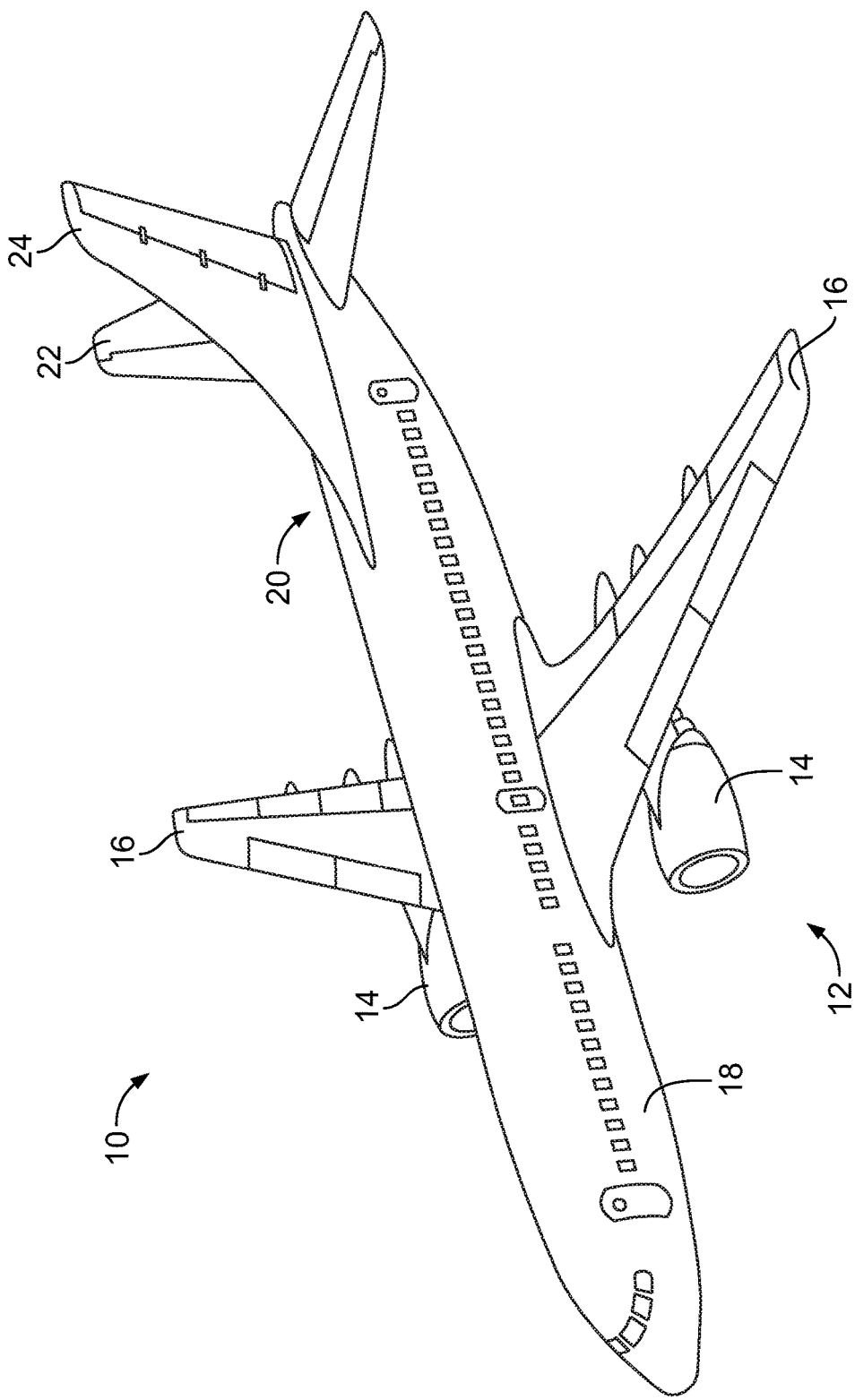
FIG. 1 illustrates a perspective top view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide a self-cleaning floor assembly that may be used in a lavatory, such as a lavatory within a commercial aircraft. The self-cleaning floor assembly includes a moveable floor that is operatively coupled to an actuation system. The actuation system is configured to move a portion of the moveable floor through a cleaning system. The cleaning system includes a vacuum, a cleaner, and/or a dryer.

The moveable floor may include a floor panel, such as a belt, that is conveyed through the cleaning system by an actuation system. As the floor panel moves through the cleaning system, the vacuum removes debris from the floor panel (such as through vacuuming or suctioning the debris). The floor panel then continues to move through the cleaning system such that the cleaner sanitizes, disinfects, or otherwise cleans the floor panel. For example, the cleaner may include one or more nozzles that are in fluid communication with a tank that stores cleaning fluid, such as a soap solution, disinfectant fluid, sanitizing fluid, anti-bacterial fluid, and/or antimicrobial fluid. The cleaner deposits the cleaning fluid on to the floor panel, such as by spraying, wiping, applying via a sponge, or the like the cleaning fluid onto the floor panel that is conveyed through the cleaner. After the cleaning agent is applied to the moving floor, a dryer dries the floor panel to remove liquid therefrom. For example, the dryer may include a fan(s), blower(s), heat lamp(s), and/or the like.

In at least one other embodiment, the cleaner may include one or more ultraviolet (UV) lights that are configured to irradiate the floor panel, thereby cleaning (for example, sterilizing) the floor panel. In at least one embodiment, the cleaner may apply the cleaning agent to the floor panel and include a UV light to irradiate the floor panel.

The self-cleaning floor assembly may be operatively coupled to a lavatory door, for example. A cleaning cycle may be linked to movement of the lavatory door. For example, each time the lavatory door is closed after use, the cleaning cycle may be triggered. In at least one embodiment, a control unit may initiate the cleaning cycle when the door is unlocked, opened, and then closed. For example, when an individual uses the lavatory, the individual closes and locks the door while within the lavatory. In order to leave the lavatory after use, the individual unlocks the door, opens the door, and then closes the unlocked door (or the unlocked door automatically closes, such as through spring-biased hinges) as the individual exits the door. The control unit detects the door motion sequence and may then initiate the cleaning cycle.

The self-cleaning floor assembly may refrain from cleaning the moveable floor when an individual is within the lavatory. For example, when the lavatory door is locked, the self-cleaning assembly may refrain from initiating or otherwise activating the cleaning cycle.

The moveable floor may include the floor panel, which may include a single contiguous structure, or one or more floor segments. The floor panel may be configured to provide a conveyor or revolving floor track. The floor panel may have a width that is aligned with a threshold of the lavatory. In at least one embodiment, the floor panel may be the same or approximately the same width as the threshold of the lavatory.

The self-cleaning floor assembly may be configured to rotate the floor panel of the moveable floor toward a toilet within a lavatory so that a portion of the floor panel adjacent to (for example, within two to four feet) a base or pedestal of the toilet is conveyed through the cleaning system after each use of the lavatory. In this manner, any spills on the floor panel proximate to the toilet are cleaned after each use.

Certain embodiments of the present disclosure provide systems, methods, and assemblies that provide an anti-skid floor that is clean and devoid of liquid. Certain embodiments of the present disclosure are configured to clean and remove liquid from a floor surface. The floor may be automatically sterilized or otherwise cleaned, such as through UV light irradiation. Further, embodiments of the present disclosure provide a cost effective, lightweight, and easy to manufacture floor assembly.

FIG. 1 illustrates a perspective top view of an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

The internal cabin includes one or more lavatories, for example. Embodiments of the present disclosure provide systems and methods that are configured to automatically clean floors within the lavatories. In particular, each lavatory may include a self-cleaning floor assembly that is configured to automatically clean at least a portion of the floor (such as a portion that is proximate to a toilet and sink during use by an individual) after the lavatory is used by an individual. The self-cleaning floor assembly may automatically clean the portion(s) of the floor after each use, or after a predetermined number of uses (such as after two, three, four, or five uses by one or more individuals).

Alternatively, instead of an aircraft, embodiments of the present disclosure may be used with various other vehicles, such as automobiles, buses, locomotives and train cars, watercraft, spacecraft, and the like. Further, embodiments of the present disclosure may be used with respect to fixed structures, such as commercial and residential buildings. As an example, embodiments of the present disclosure may be used to automatically clean floor of lavatories, whether or not the lavatories are within vehicles.

Figure 2A:
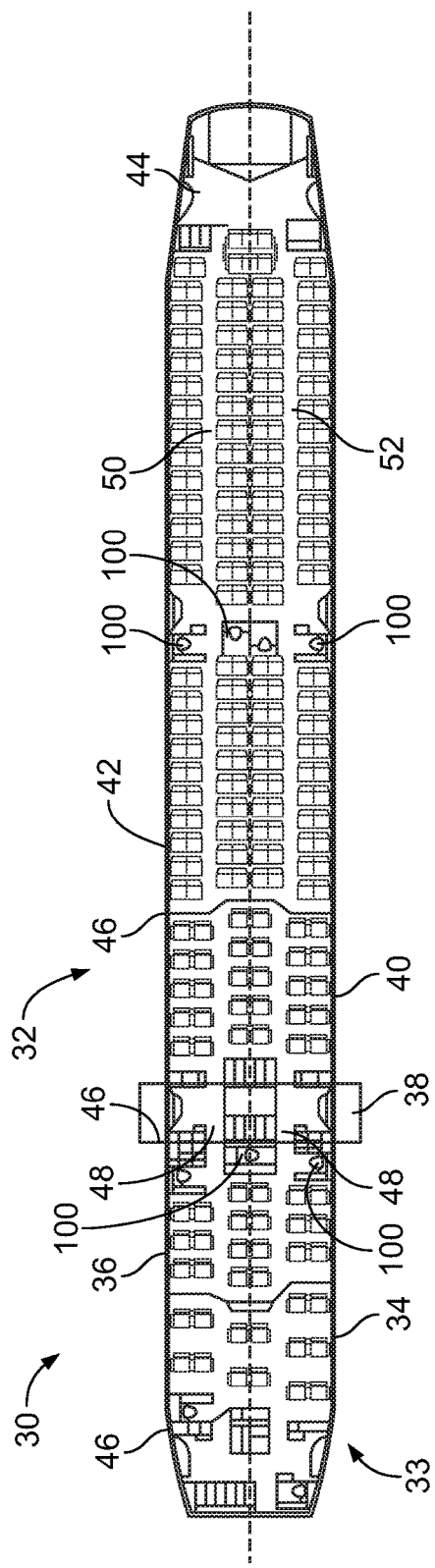
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34 (or first class suites, cabins, for example), a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

One or more lavatories 100 may be located within the internal cabin 30. The lavatories 100 may include self-cleaning floor assemblies that are configured to automatically clean floor portions after one or more uses of the lavatories. Each self-cleaning floor assembly may be configured to clean the floor portion when the lavatory is unoccupied by an individual. Additionally, the self-cleaning floor assembly may include at least one UV light that is configured to irradiate the floor portion during a cleaning cycle. The UV light rids the dry floor assembly of germs, bacteria, microbes, and/or the like. The UV light is configured to irradiate or otherwise emit UV light onto the floor portion in order to disinfect, sanitize, clean, or otherwise rid the floor of germs, bacteria, microbes, and/or the like. The UV light may be activated when the lavatory is unoccupied.

A presence sensor within, or, or otherwise proximate to the lavatory may be used to detect a presence of an individual within the lavatory. The presence sensor may be or include one or more magnetic switches, motion sensors (such as infrared motion sensors), heat sensors, and/or the like that are configured to detect whether an individual is within the lavatory. For example, the presence sensor may be a magnetic switch coupled to a door of the interior chamber.

Figure 2B:
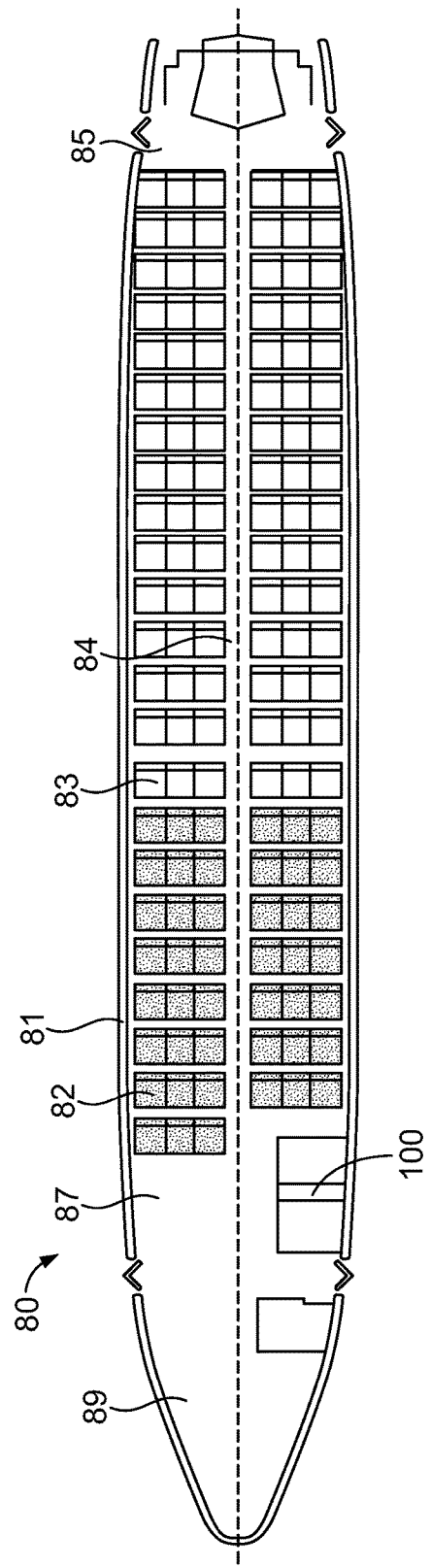
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

A self-cleaning floor assembly may be located within a lavatory 100 of the main cabin 82 at a fore section 87 proximate to a cockpit area 89. Additional lavatories 100 may be located throughout the main cabin 82.

Figure 3:
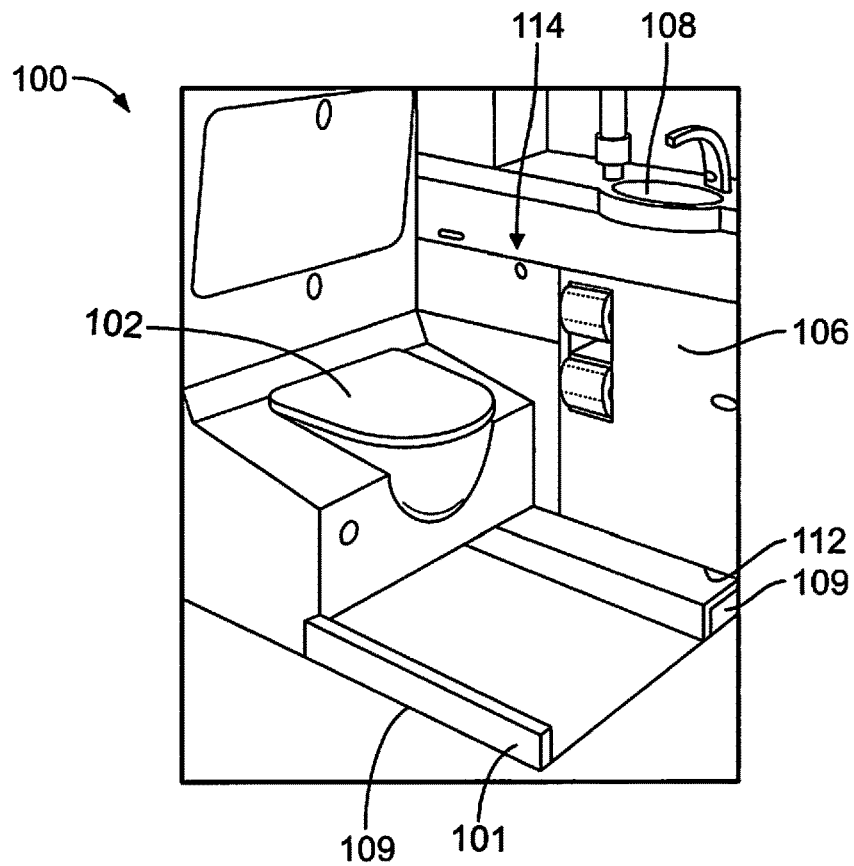
FIG. 3 illustrates a perspective internal view of a lavatory, according to an embodiment of the present disclosure.

FIG. 3 illustrates a perspective internal view of a lavatory 100, according to an embodiment of the present disclosure. The lavatory 100 may be onboard an aircraft, as described above. Optionally, the lavatory 100 may be onboard various other vehicles. In other embodiments, the lavatory 100 may be within a fixed structure, such as a commercial or residential building.

The lavatory 100 includes a base floor 101 that supports a toilet 102, cabinets 106, and a sink 108. The base floor 101 may include opposed brackets 109 that are configured to securely retain a self-cleaning floor assembly therebetween. Optionally, the base floor 101 may be or otherwise include the self-cleaning floor assembly. A UV light 112 may be positioned at a lower end of the cabinets 106. The UV light 112 is configured to irradiate the dry floor assembly with UV light during a cleaning cycle when an internal space 114 of the lavatory 100 is unoccupied. As noted, the self-cleaning floor assembly may also include a UV light.

Figure 4:
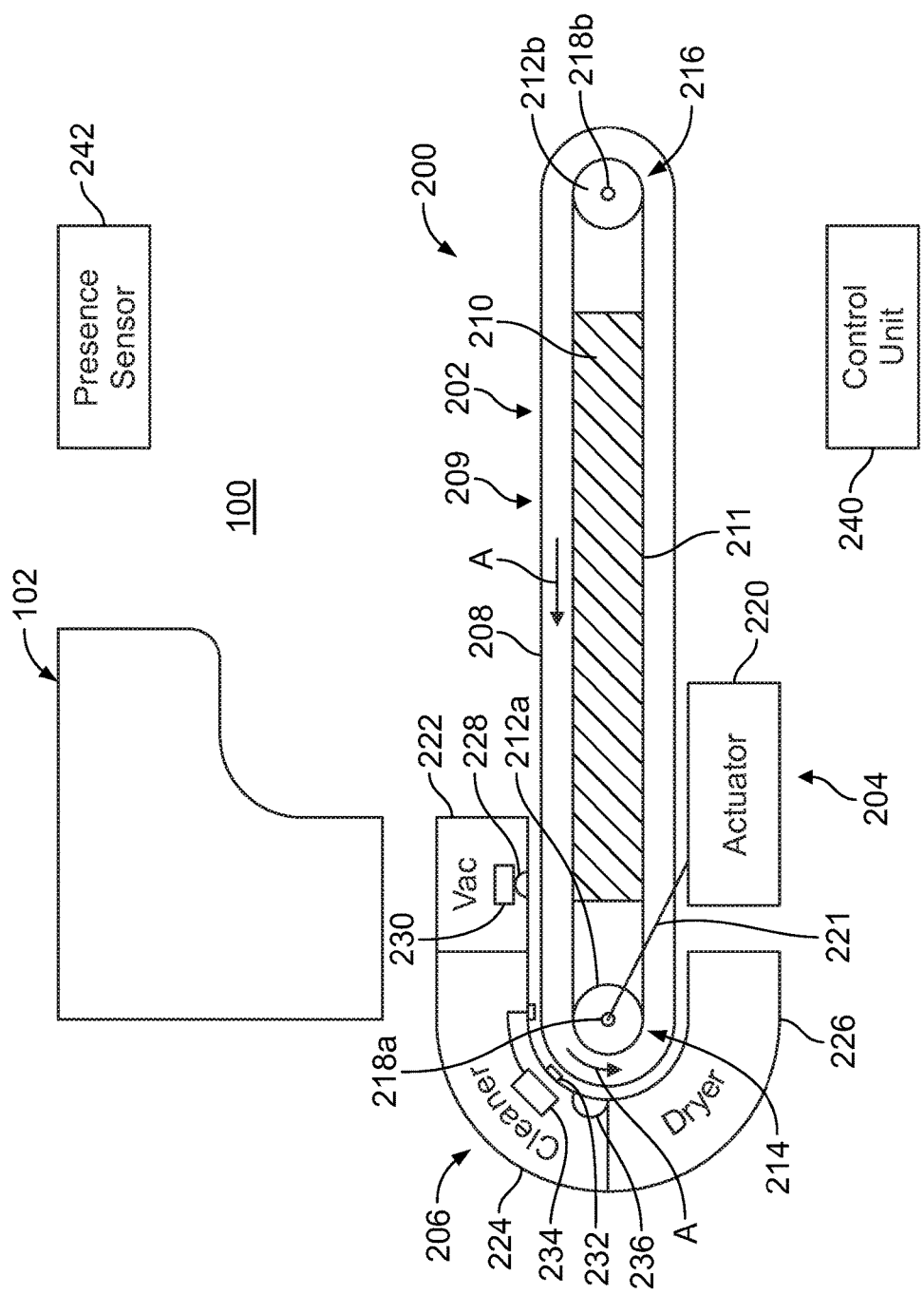
FIG. 4 illustrates a schematic diagram of a self-cleaning floor assembly, according to an embodiment of the present disclosure.

FIG. 4 illustrates a schematic diagram of a self-cleaning floor assembly 200, according to an embodiment of the present disclosure. The self-cleaning floor assembly 200 may be located within a lavatory 100 having a toilet 102. Alternatively, the self-cleaning floor assembly 200 may be located within various other spaces, such as a clean room, a laboratory, and/or the like.

The self-cleaning floor assembly 200 may include a moveable floor 202 that is operatively coupled to an actuation system 204. A cleaning system 206 is positioned at one end of the moveable floor 202. Optionally, the cleaning system 206 may be positioned underneath the moveable floor 202. In at least one other embodiment, the cleaning system 206 may be positioned above a portion of the moveable floor 202, at an opposite end of the moveable floor, or may include components at various points along the moveable floor, whether at ends, lower portions, upper portions, and/or the like.

The moveable floor 202 may include a floor panel 208 that is moveably secured around a support 210 and conveyors 212. The floor panel 208 is flexible, and is configured to be rotated about the support 210 and the conveyors 212. In at least one embodiment, the floor panel 208 may be a single, contiguous, monolithic floor panel that forms a loop that extends around the support 210. In at least one embodiment, the floor panel 208 may be formed of a single panel of rubber, elastomeric material, flexible plastic, and or the like. The single panel is connected at opposite ends to form a single loop. Optionally, the floor panel 208 may include multiple floor segments that are linked together and extend around the support 210 and the conveyors 212.

The support 210 may include one or more of walls, rails, tracks, and/or the like that support the floor panel 208. As shown, conveyors 212a and 212b are located at opposite ends of the moveable floor 202. For example, a front conveyor 212a is positioned at a front end 214 of the moveable floor 202, while a rear conveyor 212b is positioned at a rear end 216 of the moveable floor 202. The support 210 and the conveyors 212 remain in place. As the conveyors 212 rotate about fixed axles 218a and 218b, the floor panel 208 rotates about the support 210 and the conveyors 212 in response. Additional conveyors may also be used.

Each conveyor 212a and 212b may be or include a roller, for example. In at least one other embodiment, each conveyor 212a and 212b may include aligned wheels that are linked by an axle. The conveyor 212a and 212b may include outer gears that engage reciprocal internal structures of the floor panel 208.

The actuation system 204 may include an actuator 220 that couples to the conveyor 212a through a link 221. The actuator 220 may be a motor, for example. The link 221 may be one or more of a belt, gears, worm screw, pulleys, chain, and/or the like that are configured to operatively couple the actuator 220 to the conveyor 212a. Optionally, the actuator 220 may be operatively coupled to the conveyor 212b. In at least one embodiment, the actuator 220 may be operatively coupled to both of the conveyors 212a and 212b.

The cleaning system 206 includes a vacuum 222, a cleaner 224, and a dryer 226. Alternatively, the cleaning system 206 may not include all of the vacuum 222, the cleaner 224, and the dryer 226. For example, the cleaning system 206 may include only the vacuum 222. In at least one other embodiment, the cleaning system 206 may include only the cleaner 224.

The vacuum 222 includes one or more inlets 228 that are in fluid communication with a vacuum generator 230. When the vacuum generator 230 is activated, a vacuum force is generated that vacuums or otherwise suctions debris into a waste tank (which may be within the vacuum 222 or coupled thereto through a hose, for example).

As shown, the vacuum generator 230 may be within the cleaning system 206. In at least one other embodiment, the vacuum generator 230 may be remotely located from the self-cleaning floor assembly 200. For example, the vacuum generator 230 may be part of a vacuum system that is coupled to the toilet 102. In such an embodiment, the vacuum 222 of the cleaning system 206 may be coupled to the vacuum system through one or more conduits (for example, hose(s), tube(s), pipe(s), and/or the like). Accordingly, when the vacuum system is activated (that is, when the vacuum system generates a vacuum or suction force through the conduits), the ensuing vacuum or suction force draws debris, liquid, and/or the like that may be on the floor panel 208 into the vacuum 222 of the cleaning system 206.

The vacuum system may be activated when the toilet 102 is flushed. In at least one other embodiment, the vacuum system may be activated when a lavatory in which the toilet 102 is located is unoccupied. For example, an individual may engage a button or lever on the toilet 102 to flush the toilet, but the lavatory 100 may be configured such that the toilet 102 flushes (thereby activating the vacuum system) after the individual leaves the lavatory 100 (such as when the individual unlocks and closes the door to the lavatory).

The cleaner 224 may include one or more nozzles 232 fluidly connected to a storage tank 234. The storage tank 234 stores cleaning fluid, such as a soap solution, detergent, disinfectant fluid, sanitizing fluid, anti-bacterial fluid, anti-microbial fluid, and/or the like. One or more valves may be disposed within a conduit (such as a hose, tube, pipe, or the like) that couples the nozzles 232 to the storage tank 234. The valves are configured to be controlled to selectively open and close the conduit to allow or prevent the cleaning fluid from being delivered to the nozzles 232. For example, during a cleaning cycle, the valve(s) is opened so that cleaning fluid is deposited onto the moveable floor through the nozzles 232. In at least one embodiment, a control unit 240 is in communication with the valve(s) through one or more wired or wireless connections, and is configured to control the valve(s).

The cleaner 224 may also include one or more UV lights 236 that are configured to irradiate or otherwise emit UV light onto portions of the floor panel 208 as they rotate past the UV light during a cleaning cycle. The emitted UV light rids the floor panel 208 of germs, bacteria, and microbes. Alternatively, the cleaner 224 may be or otherwise include only one or more UV lights 236.

The dryer 226 may be a fan, blower, heat lamp, and/or the like. The dryer 226 is configured to dry portions of the floor panel 208 as they rotate past the dryer 226 during a cleaning cycle. Alternatively, the cleaning system 206 may not include the dryer 226.

As shown, the cleaning system 206 may be positioned proximate to the toilet 102. For example, the cleaning system 206 may be positioned underneath and/or behind a portion of the toilet 102, inside a sink, cabinet, and/or the like. As such, after the lavatory is used, the floor panel 208 is rotated so that that a portion of the floor panel 208 proximate to the toilet 102 is cleaned by the cleaning system 206. For example, during a cleaning cycle, the floor panel 208 may be rotated half of one full rotation. Accordingly, the exposed portion 209 (that is the portion of the floor panel 208 that is visible within the lavatory 100 when occupied by an individual) is conveyed through (for example, past) the cleaning system 206, and the shrouded portion 211 (that is, the portion of the floor panel 208 underneath and/or otherwise hidden within the lavatory 100 when occupied by an individual) is correspondingly rotated to become the exposed portion 209.

Optionally, during the cleaning cycle, the floor panel 208 may be rotated a full rotation (such that a point on the floor panel is rotated fully back in a single rotation direction to an initial position from which the rotation started). In at least one other embodiment, during the cleaning cycle, the floor panel 208 may be rotated less than a half rotation. For example, during the cleaning cycle, the floor panel 208 may be rotated one quarter rotation, such that only a portion within a few feet (for example, two to three feet) of the toilet 102 is cleaned by the cleaning system 206.

Alternatively, the cleaning system 206 may be located at various other portions in relation to the toilet 102. For example, the cleaning system 206 may be located underneath the moveable floor 202. In at least one other embodiment, the cleaning system 206 may extend around the moveable floor 202 between the ends 214 and 216.

In operation, a cleaning cycle may be activated after the lavatory 100 has been used. During the cleaning cycle, the actuation system 204 rotates the floor panel 202 in the direction of arrow A, such that the exposed portion 209 passes through (for example, within, past, around, or the like) the cleaning system 206. As the exposed portion 209 passes through the cleaning system 206, the vacuum 222 is activated. The activated vacuum 222 removes debris that may be on the exposed portion 209. For example, the vacuum generator 230 generates a vacuum force that suctions the debris into the inlets 228.

With continued rotation in the direction of arrow A, the vacuumed portion of the floor panel 208 is then conveyed through the cleaner 224, which is activated to disinfect, sanitize, or otherwise clean the portion of the floor panel 202 that was just vacuumed. For example, the cleaner 224 may apply cleaning fluid onto the portion of the floor panel 202 via the nozzles 232, and/or irradiate the portion of the floor panel 202 with sterilizing light via the UV light 236.

With continued rotation in the direction of arrow A, the vacuumed and cleaned portion of the floor panel 208 is conveyed through the dryer 226. The dryer 226 is activated during the cleaning cycle to dry the portion of the floor panel 208 to remove liquid therefrom.

A control unit 240 may be in communication with the actuation system 204 and the cleaning system 206 through one or more wired or wireless connections. The control unit 240 may be housed within a portion of the self-cleaning floor assembly 200, or remotely located therefrom.

The control unit 240 may also be in communication with a presence sensor 242 through one or more wired or wireless connections. The presence sensor 242 may be on, within, or proximate to the lavatory 100.

The control unit 240 may be configured to control operation of the self-cleaning floor assembly 200. For example, the control unit 240 receives presence signals from the presence sensor 242 that indicate whether or not an individual is within the lavatory 100. The presence sensor may be or include one or more magnetic switches, motion sensors (such as infrared motion sensors), heat sensors, and/or the like that are configured to generate presence signals indicative of whether or not an individual is within the lavatory 100. For example, the presence sensor may be a magnetic switch coupled to a door of the lavatory 100. When the control unit 240 determines that the lavatory 100 is occupied, such as through one or more signals received from the presence sensor 242, the control unit 240 refrains from activating the actuator 220 and the cleaning system 206. After the individual leaves the lavatory 100, and the control unit 240 determines that the lavatory 100 is unoccupied (through one or more signals received from the presence sensor 242), the control unit 240 activates the actuator 220 and the cleaning system 206 to clean at least a portion of the floor panel 208 (such as the exposed portion 209).

As described above, the control unit 240 may be configured to control operation of the self-cleaning floor assembly 200 to sterilize, disinfect, or otherwise clean the floor panel 208. As noted, the control unit 240 may be operatively coupled to the actuation system 204 and the cleaning system 206, such as through one or more wired or wireless connections. Accordingly, the control unit 240 is configured to control operation of the actuation system 204 and the cleaning system 206.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 240 may be or include one or more processors that are configured to control operation of the self-cleaning floor assembly 200.

The control unit 240 is configured to execute a set of instructions that are stored in one or more storage elements (such as one or more memories), in order to process data. For example, the control unit 240 may include or be coupled to one or more memories. The storage elements may also store data or other information as desired or needed. The storage elements may be in the form of an information source or a physical memory element within a processing machine.

The set of instructions may include various commands that instruct the control unit 240 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 240. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 240 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 5:
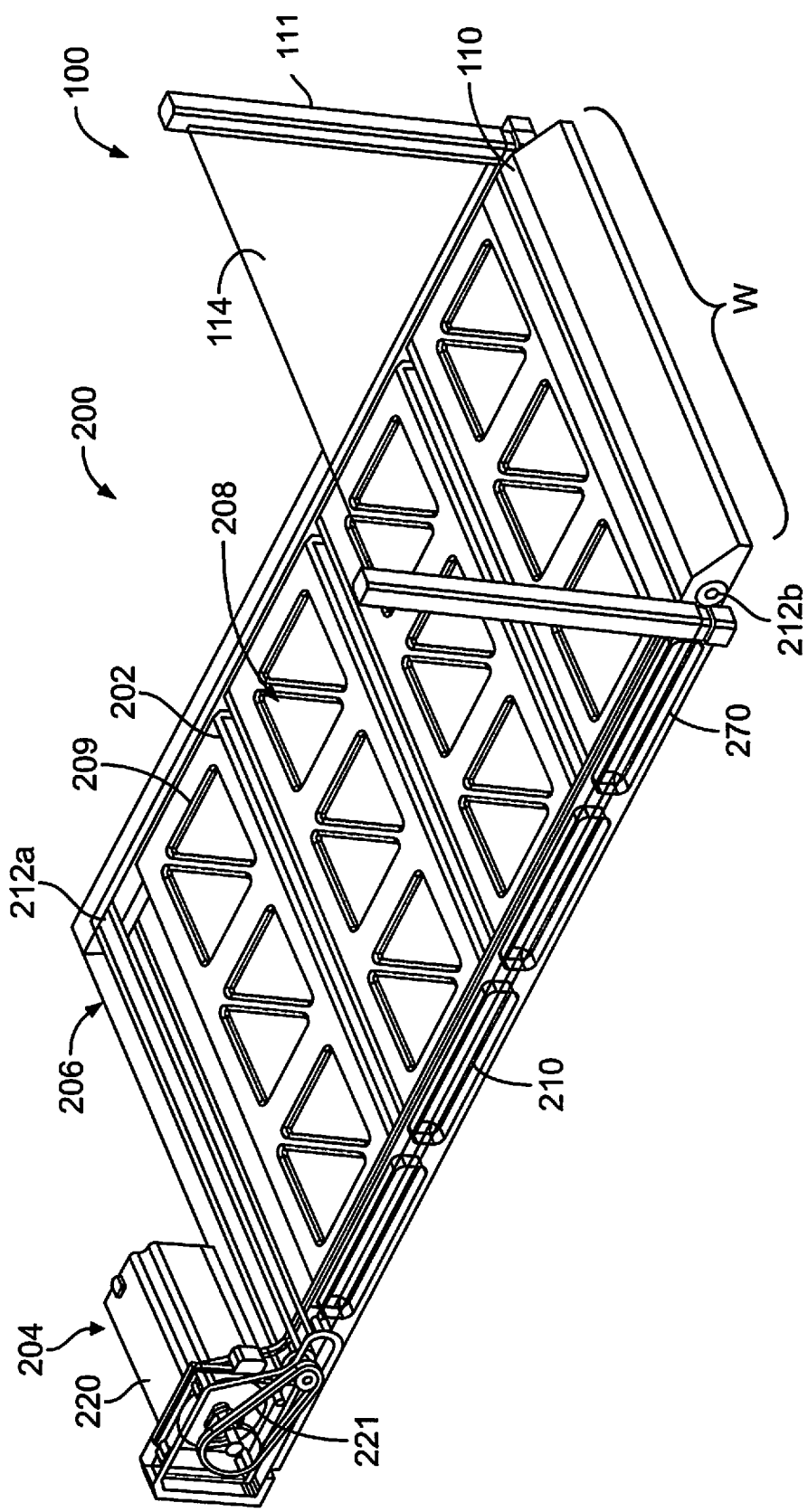
FIG. 5 illustrates a perspective top view of a self-cleaning floor assembly, according to an embodiment of the present disclosure.

FIG. 5 illustrates a perspective top view of the self-cleaning floor assembly 200, according to an embodiment of the present disclosure. The moveable floor 208 may be moveably secured within a support base 270 that securely retains the conveyors 212a, 212b and the support 210. As shown, the width W of the floor panel 208 may be the same as that of a threshold 110 extending through a door frame 111 of the lavatory 100. The door frame 111 moveably retains a door 114. As such, the exposed portion 209 of the floor panel 208 may provide an entirety (or substantially an entirety) of a surface on which an individual may stand within the lavatory 100, thereby ensuring that no portion of a floor that may support an individual within the lavatory is left uncleaned by the self-cleaning floor assembly 200. Alternatively, the width W of the floor of the panel 208 may be greater or less than the width of the threshold 110.

Figure 6:
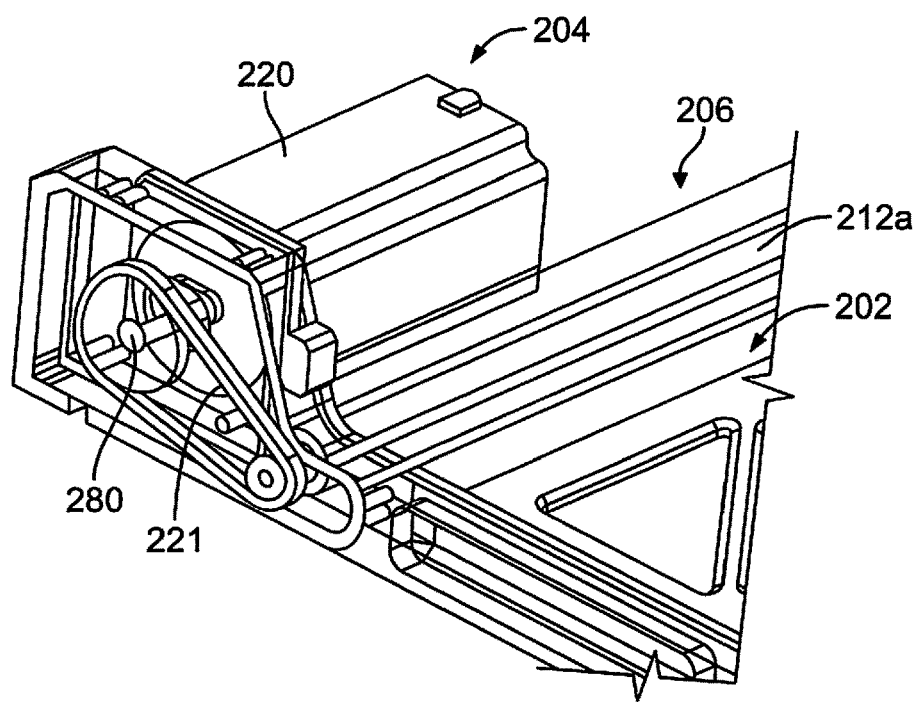
FIG. 6 illustrates a perspective top view of an actuation system coupled to a moveable floor, according to an embodiment of the present disclosure.

FIG. 6 illustrates a perspective top view of the actuation system 204 coupled to the moveable floor 202, according to an embodiment of the present disclosure. The actuator 220 may be a rotary motor having a gear 280 that couples to the link 221, which may be a belt that reciprocally engages the gear 280. The link 221 (for example, the belt) also engages a portion of the conveyor 212a. As motion is imparted by the actuator 220 into the link 221 via the gear 280, the link 221 rotates, thereby imparting a corresponding motion in the conveyor 212a, and therefore the floor panel 208 and the other conveyor 212b.

Alternatively, the actuation system 204 may be configured to rotate the floor panel 208 through various other mechanisms. For example, the actuator 220 may include a worm screw, pulley(s), a servo motor(s), roller(s), and/or the like that are configured to operatively couple to one or both of the conveyors 212a, 212b and/or the floor panel 208.

Referring to FIGS. 4-6, the cleaning cycle may be linked to movement of the lavatory door 114. For example, each time the lavatory door 114 is closed after use, the cleaning cycle may be triggered. In at least one embodiment, the control unit 240 may initiate the cleaning cycle when the door 114 is unlocked and closed after being locked. For example, when an individual uses the lavatory, the individual closes and locks the door 114 while within the lavatory 100. In order to leave the lavatory after use, the individual unlocks the door 114, opens the door 114, and then closes the unlocked door 114 (or the unlocked door automatically closes, such as through spring-biased hinges) as the individual exits the lavatory 100. The control unit 240 detects the door sequence (such as by monitoring signals output by the presence sensor 242) and may then initiate the cleaning cycle. In at least one embodiment, the lavatory door 114 automatically locks during a cleaning cycle, and unlocks when ready for use after the cleaning cycle.

The self-cleaning floor assembly 200 may refrain from cleaning the moveable floor 202 when an individual is within the lavatory 100. For example, when the lavatory door 114 is locked, the self-cleaning assembly 200 may refrain from initiating or otherwise activating the cleaning cycle. For example, the control unit 240 may determine that an individual is within the lavatory 100, such as by monitoring signals output by the presence sensor 242. When the control unit 240 determines that an individual is within the lavatory 100, the control unit 240 may prevent the actuation system 204 and the cleaning system 206 from activating.

Figure 7:
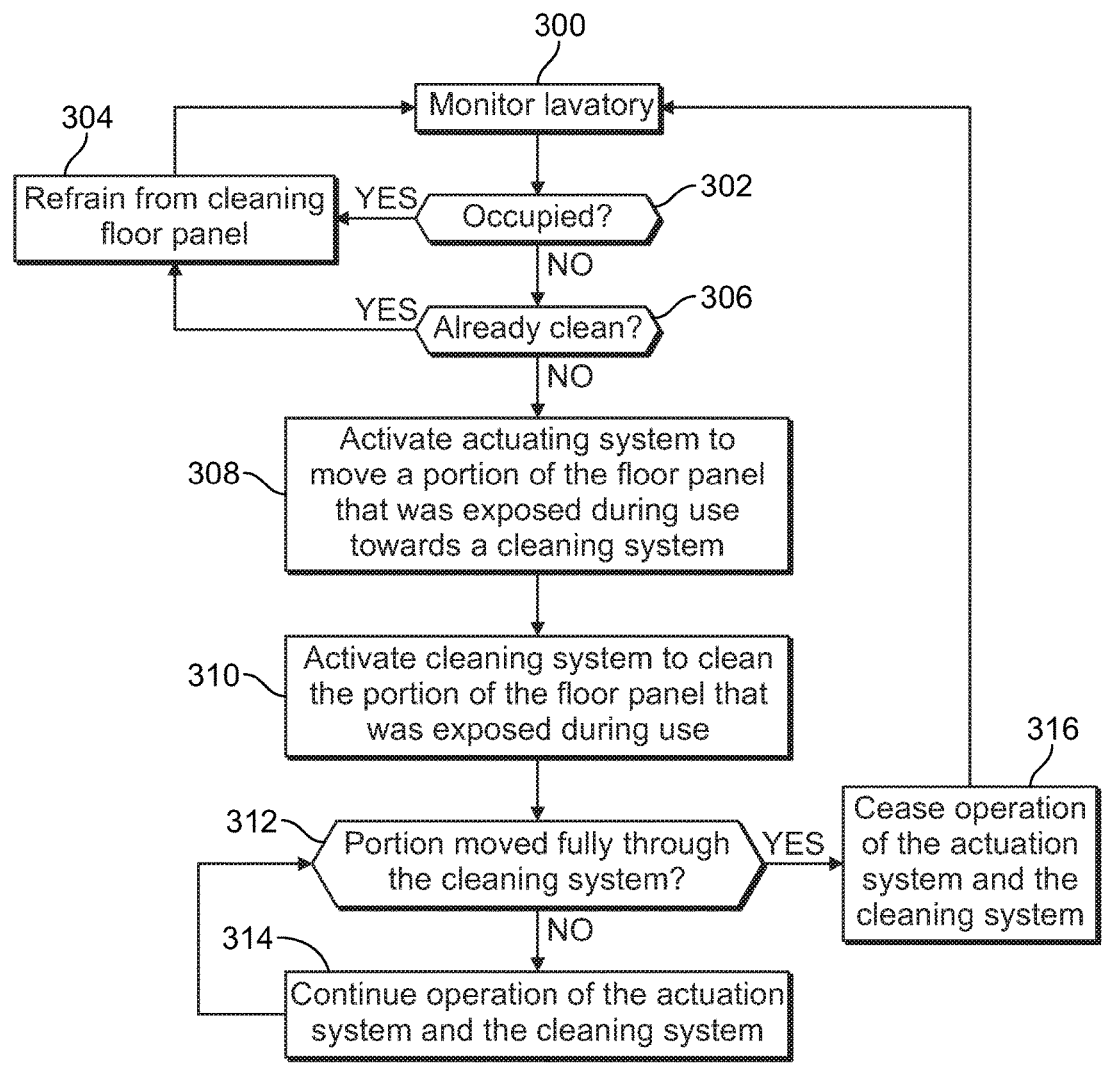
FIG. 7 illustrates a flow chart of a method of automatically cleaning a floor of a lavatory, according to an embodiment of the present disclosure.

FIG. 7 illustrates a flow chart of a method of automatically cleaning a floor of a lavatory, according to an embodiment of the present disclosure. Referring to FIGS. 4-7, the control unit 240 monitors the lavatory 100. For example, the control unit 240 may receive signals output by the presence sensor 242 to determine whether or not an individual is within the lavatory 100. At 302, based on the signals received from the presence sensor 242, the control unit 240 determines whether the lavatory 100 is occupied. If the lavatory is occupied, the control unit 240 refrains from initiating a cleaning cycle at 304. That is, the control unit 240 refrains from cleaning the floor panel 208.

If, however, the control unit 240 determines at 302 that the lavatory 100 is not occupied, the method proceeds from 302 to 306, in which the control unit 306 determines if the lavatory 100 is already clean. For example, if the lavatory 100 has not been occupied since a previous cleaning, the lavatory 100 is already clean. In at least one embodiment, the control unit 240 may determine whether the lavatory 100 has not been occupied from a previous cleaning by analyzing a motion sequence of the door 114. For example, the control unit 240 may initiate a cleaning cycle after detecting a motion sequence in which the door is locked (indicating the lavatory is occupied), and then unlocked, opened, and closed, at which point the control unit 240 may initiate the cleaning cycle. If the door has not been reopened after the cleaning cycle, the control unit 240 determines that the lavatory has not been re-occupied after the cleaning cycle, and is therefore already clean. In at least one embodiment, the control unit 240 may determine whether the lavatory 100 is occupied and/or whether the lavatory 100 is clean through one or more pressure sensors in the floor that are configured to detect the presence of an individual, operation of a cleaning cycle (such as pressure exerted by a moveable floor), and/or the like.

At 306, if the control unit 240 determines that the floor panel 208 is already clean, the method proceeds from 306 to 304, in which the control unit 240 refrains from initiating the cleaning cycle. The method then returns to 300 from 304.

If, however, the control unit 306 determines that the floor panel 208 is not clean at 306 (such as through an analysis of a door motion sequence), the control unit 306 activates a cleaning cycle. In particular, the control unit 240 at 308 activates the actuating system 204 to move a portion of the floor panel that was exposed during use of the lavatory by an individual towards a cleaning system 306. At 310, the control unit 240 activates the cleaning system 206 to clean the portion of the floor panel 208 that was exposed during use. For example, the cleaning system 206 may vacuum, clean, and dry the portion of the floor panel 208 that was exposed during use.

At 312, the control unit 240 determines whether the portion of the floor panel 208 that was exposed during use has been fully moved through the cleaning system 206 That is, the control unit 240 determines whether the portion of the floor panel 208 that was exposed during use has moved through or otherwise by the entire cleaning system 206.

If the control unit 240 determines at 312 that the portion of the floor panel 208 that was exposed during use has not moved fully through the cleaning system, the method proceeds to 314, in which the control unit continues operation of the actuation system 204 and the cleaning system 206. The method then returns to 312.

If, at 312, the control unit 240 determines that portion of the floor panel 208 that was exposed during use has been moved fully through the cleaning system 206, the method proceeds from 312 to 316, in which the control unit 240 ceases operation of the actuation system 204 and the cleaning system 206. The method then returns to 300 from 316.

Figure 8:
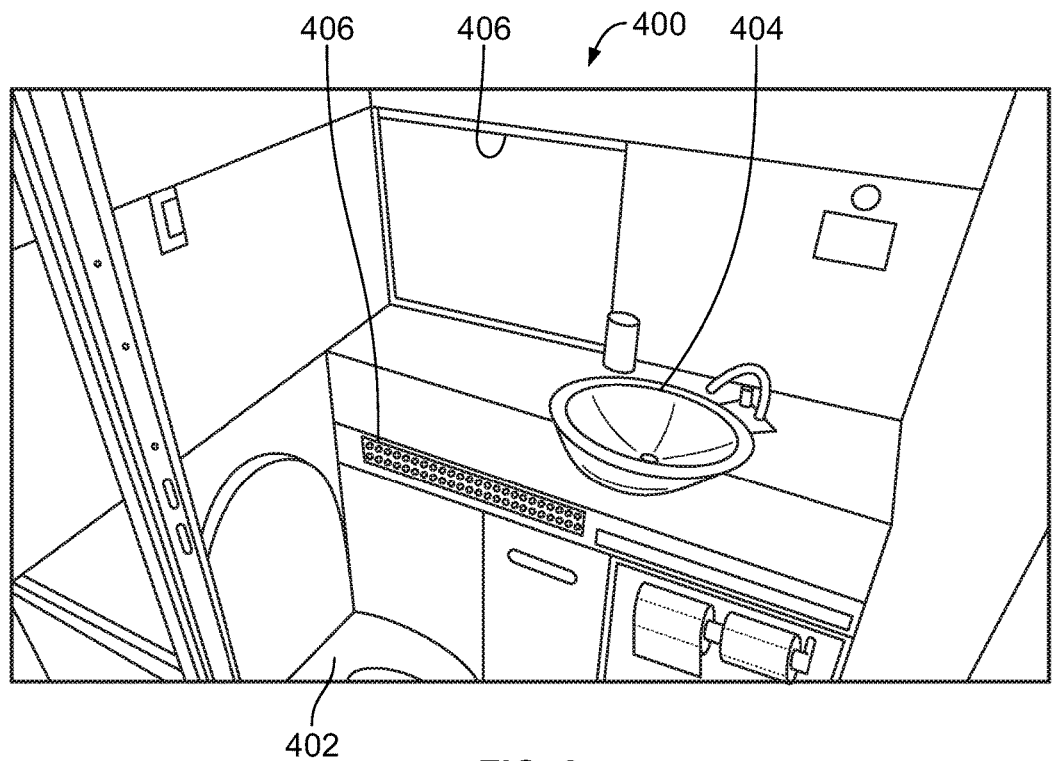
FIG. 8 illustrates a perspective top internal view of a lavatory, according to an embodiment of the present disclosure.

FIG. 8 illustrates a perspective top internal view of a lavatory 400, according to an embodiment of the present disclosure. The lavatory 400 is configured to be secured within a vehicle, such as an aircraft. The lavatory 400 includes a toilet 402, a sink 404, and one or more ultraviolet lights 406 that are configured to emit ultraviolet light into the lavatory 400 during a UV cleaning cycle when the lavatory 400 is unoccupied. The lavatory 400 may also include a self-cleaning floor assembly, such as those described above. The UV cleaning cycle may occur at the same time, or at a different time than the cleaning cycle of the self-cleaning floor assembly described above.

Figure 9:
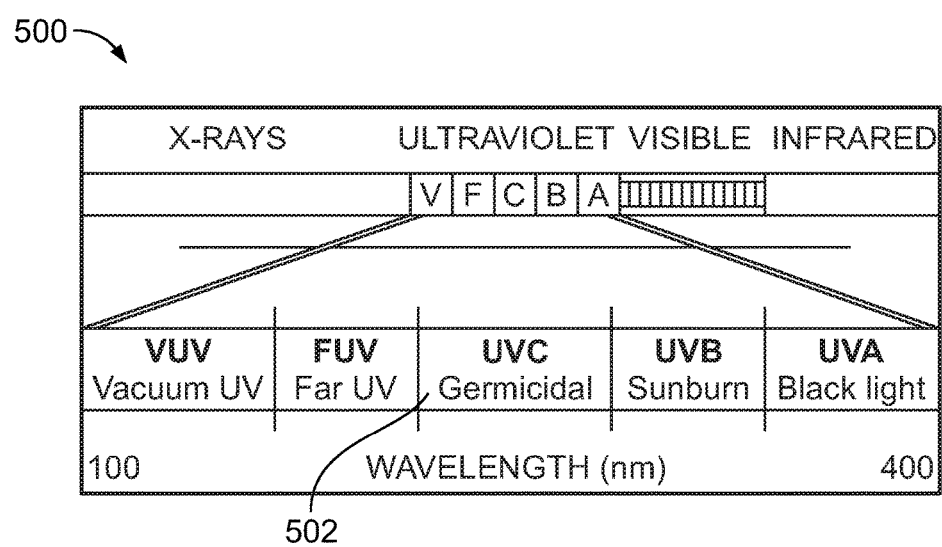
FIG. 9 illustrates a far ultraviolet spectrum.

FIG. 9 illustrates a far ultraviolet spectrum 500. Embodiments of the present disclosure may emit light within the far ultraviolet spectrum 500 to sanitize interior portions of a lavatory, for example. In particular, embodiments of the present disclosure may emit light within a germicidal UVC portion 502 of the spectrum 500. It has been found that by emitting UV light in the far ultraviolet spectrum 500, the ultraviolet lights of embodiments of the present disclosure provide cleaning cycles that are extremely fast and efficient (for example, lasting 2-3 seconds). Embodiments of the present disclosure provide ultraviolet cleaning systems and methods that are configured to sterilize surfaces within the lavatory within seconds.

Figure 10:
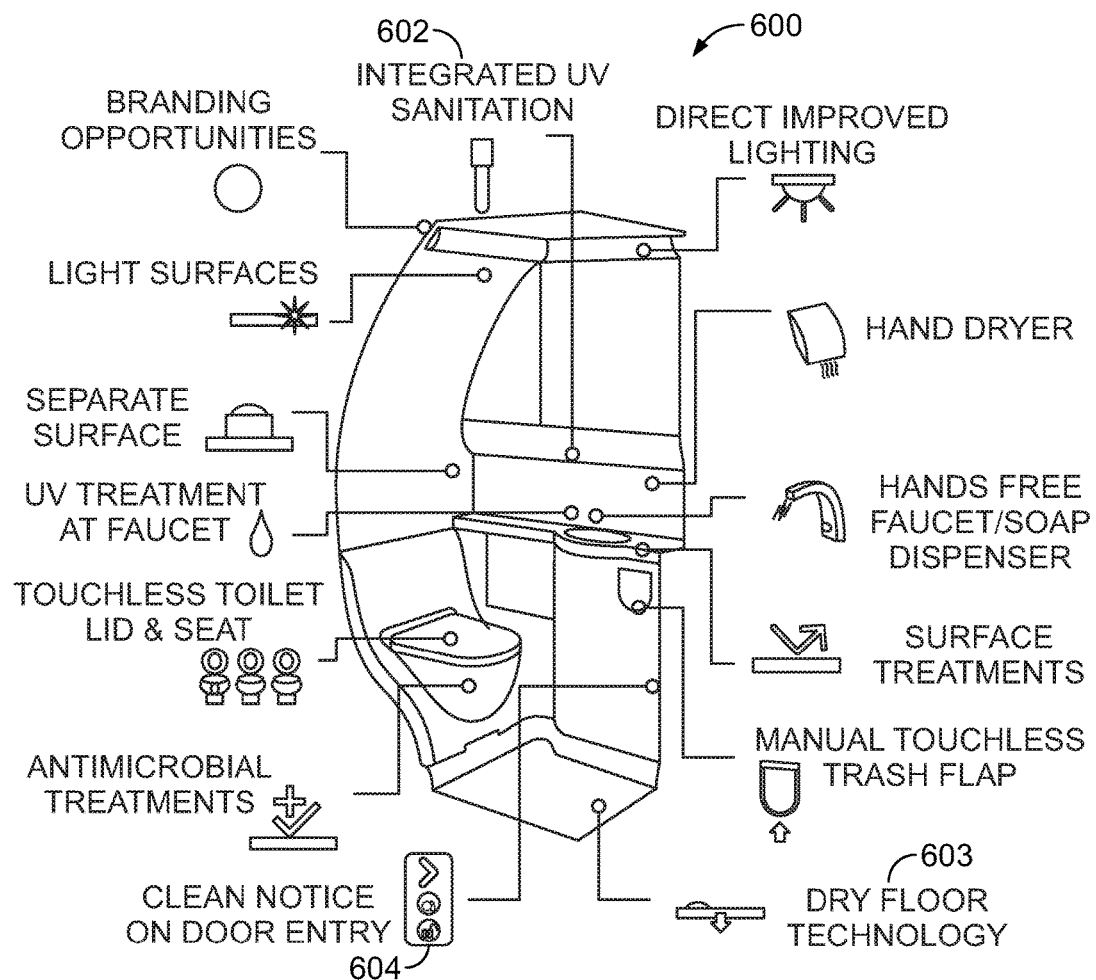
FIG. 10 illustrates a schematic interior view of a lavatory, according to an embodiment of the present disclosure.

FIG. 10 illustrates a schematic interior view of a lavatory 600, according to an embodiment of the present disclosure. The lavatory 800 may include an integrated UV sanitation system 602, which may include one or more UV lights that are configured to emit light into the lavatory 600 during a cleaning cycle (such as when the lavatory is unoccupied). The lavatory 600 may also include a self-cleaning floor assembly 603, such as those described above.

A status indicator 604 may also be positioned on a door or frame of the lavatory 600. The status indicator 604 is configured to provide status information regarding a cleaning cycle (such as a UV cleaning cycle, and/or a cleaning cycle of the moveable floor, as described above). Various surfaces within the lavatory 600 may be coated or otherwise treated with antimicrobial materials, titanium dioxide, and/or the like.

Figure 11:
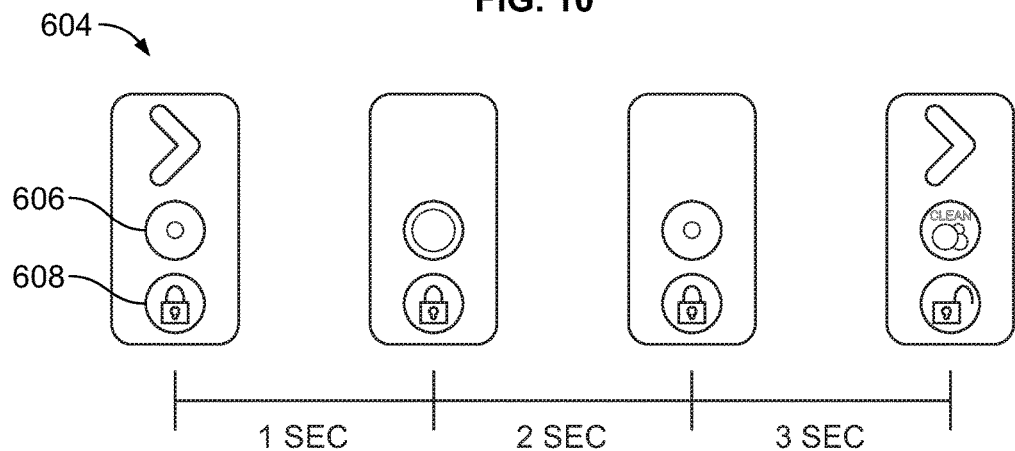
FIG. 11 illustrates a front view of a status indicator during a cleaning cycle, according to an embodiment of the present disclosure.

FIG. 11 illustrates a front view of the status indicator 604 during a cleaning cycle, according to an embodiment of the present disclosure. The status indicator 604 includes a cleaning status light 606 (such as one or more light emitting diodes) and a lock light 608 (such as one or more light emitting diodes). During a UV cleaning cycle, the cleaning status light 606 may change to indicate a cleaning spectrum (from unclean to clean, for example). During the cleaning cycle, the door of the lavatory may be locked, which is indicated by the lock light 608. After the cleaning cycle, the lock light 608 indicates that the door is unlocked. As shown in FIG. 11, the UV cleaning process may last just a few seconds. Optionally, the cleaning process may be shorter or longer than shown in FIG. 11.

As described above, embodiments of the present disclosure provide systems and methods for efficiently and effectively cleaning surfaces within interior chambers, such as lavatories. Embodiments of the present disclosure provide systems and methods that are configured to automatically clean interior spaces, such as those of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A self-cleaning floor assembly that is configured to form or be positioned on a floor of an enclosed space, the self-cleaning floor assembly comprising:
   a moveable floor including a moveable floor panel;
   an actuation system that is operatively coupled to the floor panel; and
   a cleaning system proximate to at least a portion of the moveable floor, wherein the actuation system is configured to move at least a portion of the floor panel into and through the cleaning system during a cleaning cycle, and wherein the cleaning system is configured to clean the at least a portion of the floor panel during the cleaning cycle, wherein the cleaning system comprises a vacuum that is configured to remove debris from the at least a portion of the floor panel,
wherein the vacuum comprises one or more inlets that are in fluid communication with a vacuum generator of a vacuum system that is connected to a toilet through one or more conduits.

2. The self-cleaning floor assembly of claim 1, wherein the moveable floor further comprises:
at least one conveyor moveably coupled to the floor panel; and
a support that is configured to support the floor panel.

3. The self-cleaning floor assembly of claim 1, wherein the actuation system comprises:
an actuator; and
at least one link that operatively couples the actuator to the moveable floor.

4. The self-cleaning floor assembly of claim 1, wherein the cleaning system comprises a cleaner that is configured to clean the at least a portion of the floor panel during the cleaning cycle.

5. The self-cleaning floor assembly of claim 4, wherein the cleaner comprises at least one nozzle in fluid communication with a storage tank that contains cleaning fluid, wherein the cleaning fluid is deposited onto the at least a portion of the floor panel through the at least one nozzle during the cleaning cycle.

6. The self-cleaning floor assembly of claim 4, wherein the cleaner comprises at least one ultraviolet (UV) light that is configured to irradiate the at least a portion of the floor panel during the cleaning cycle.

7. The self-cleaning floor assembly of claim 1, wherein the cleaning system comprises a dryer that is configured to dry the at least a portion of the floor panel during the cleaning cycle.

8. The self-cleaning floor assembly of claim 1, wherein the actuation system and the cleaning system are deactivated when the enclosed space is occupied by an individual.

9. The self-cleaning floor assembly of claim 1, wherein a width of the floor panel is the same as the width of a threshold of the enclosed space.

10. The self-cleaning floor assembly of claim 1, further comprising a control unit that is in communication with the actuation system and the cleaning system, wherein the control unit is configured to operate the actuation system and the cleaning system during the cleaning cycle.

11. The self-cleaning floor assembly of claim 10, wherein the control unit is configured to deactivate the actuation system and the cleaning system when the enclosed space is occupied by an individual.

12. The self-cleaning floor assembly of claim 1, wherein the vacuum is activated when the toilet is flushed.

13. A method of automatically cleaning a moveable floor within an enclosed space, the method comprising:
operatively coupling an actuation system of a self-cleaning floor assembly to a floor panel of a moveable floor of the self-cleaning floor assembly;
moving, by the actuation system, at least a portion of the floor panel into and through a cleaning system of the self-cleaning floor assembly that is proximate to the at least a portion of the floor panel of the moveable floor during a cleaning cycle; and
cleaning, by the cleaning system, the at least a portion of the floor panel during the cleaning cycle, wherein the cleaning comprises vacuuming debris from the at least a portion of the floor panel, wherein the vacuuming debris comprises coupling one or more inlets with a vacuum generator of a vacuum system that is connected to a toilet through one or more conduits.

14. The method of claim 13, wherein the operatively coupling comprises operatively coupling an actuator of the actuation system to the moveable floor with at least one link.

15. The method of claim 13, wherein the cleaning comprises depositing cleaning fluid onto the at least a portion of the floor panel.

16. The method of claim 13, wherein the cleaning comprises irradiating the at least a portion of the floor panel with ultraviolet (UV) light.

17. The method of claim 13, wherein the cleaning comprises drying the at least a portion of the floor panel.

18. The method of claim 13, further comprising deactivating the cleaning cycle when the enclosed space is occupied by an individual.

19. The method of claim 13, wherein the vacuuming further comprises activating the vacuuming when the toilet is flushed.

20. An aircraft comprising:
a fuselage having an internal cabin, wherein a lavatory is located within the internal cabin;
wings outwardly extending from the fuselage;
an empennage outwardly extending from the fuselage;
one or more engines carried by one or more of the wings and the empennage; and
a self-cleaning floor assembly that forms or is positioned on a floor of the lavatory having a toilet, wherein the self-cleaning floor assembly comprises:
a moveable floor including a moveable floor panel;
an actuation system that is operatively coupled to the floor panel; and
a cleaning system proximate to at least a portion of the moveable floor, wherein the actuation system is configured to move at least a portion of the floor panel into and through the cleaning system during a cleaning cycle, and wherein the cleaning system is configured to clean the at least a portion of the floor panel during the cleaning cycle, wherein the cleaning system comprises a vacuum that is configured to remove debris from the at least a portion of the floor panel,
wherein the vacuum comprises one or more inlets that are in fluid communication with a vacuum generator of a vacuum system that is connected to the toilet through one or more conduits,
wherein the vacuum is activated when the toilet is flushed.

* * * * *